US008965972B2

(12) United States Patent
Faulbacher et al.

(10) Patent No.: US 8,965,972 B2
(45) Date of Patent: Feb. 24, 2015

(54) METHOD AND SYSTEM FOR THE AUTOMATED PLANNING OF A MEETING BETWEEN AT LEAST TWO PARTICIPANTS

(75) Inventors: Michael Faulbacher, Augsburg (DE); Ana Lucia Silva-Goebel, Stammham (DE)

(73) Assignee: Audi AG, Ingolstadt (DE)

( * ) Notice: Subject to any disclaimer, the term of this patent is extended or adjusted under 35 U.S.C. 154(b) by 108 days.

(21) Appl. No.: 13/367,632

(22) Filed: Feb. 7, 2012

(65) Prior Publication Data

US 2012/0203833 A1  Aug. 9, 2012

(30) Foreign Application Priority Data

Feb. 8, 2011  (DE) .......................... 10 2011 010 584

(51) Int. Cl.
*G06F 15/16* (2006.01)
*G06Q 10/10* (2012.01)
*G06Q 10/02* (2012.01)

(52) U.S. Cl.
CPC ............... *G06Q 10/10* (2013.01); *G06Q 10/02* (2013.01); *G06Q 10/1093* (2013.01); *G06Q 10/1095* (2013.10)
USPC ........................................................ 709/204

(58) Field of Classification Search
CPC  G06Q 10/02; G06Q 10/1093; G06Q 10/1095
USPC ...................................................... 709/204
See application file for complete search history.

(56) References Cited

U.S. PATENT DOCUMENTS

| | | | |
|---|---|---|---|
| 2004/0021765 A1* | 2/2004 | Kubala et al. ............... 348/14.08 |
| 2006/0123082 A1* | 6/2006 | Digate et al. .................. 709/205 |
| 2007/0033091 A1* | 2/2007 | Ravikumar et al. ............... 705/9 |
| 2007/0200754 A1* | 8/2007 | Fuchs et al. ................. 342/357.1 |
| 2008/0195306 A1* | 8/2008 | Moinzadeh et al. ........... 701/201 |
| 2008/0195312 A1* | 8/2008 | Aaron et al. .................... 701/209 |
| 2008/0313005 A1* | 12/2008 | Nessland et al. .................... 705/9 |
| 2009/0210262 A1* | 8/2009 | Rines et al. ........................ 705/5 |
| 2009/0271716 A1* | 10/2009 | Jones et al. .................... 715/758 |
| 2009/0307045 A1* | 12/2009 | Chakra et al. ...................... 705/9 |
| 2010/0004005 A1 | 1/2010 | Pereira et al. |
| 2010/0094529 A1 | 4/2010 | Gupta et al. |
| 2010/0228473 A1* | 9/2010 | Ranford ......................... 701/204 |
| 2010/0293029 A1* | 11/2010 | Olliphant .......................... 705/9 |

FOREIGN PATENT DOCUMENTS

| | | |
|---|---|---|
| DE | 100 28 660 | 12/2001 |
| EP | 1 152 220 | 11/2001 |

OTHER PUBLICATIONS

German Office Action dated Oct. 30, 2014 from German Patent Application No. 10 2011 010 584.0, 4 pages.

* cited by examiner

*Primary Examiner* — Vivek Srivastava
*Assistant Examiner* — Nicholas Celani
(74) *Attorney, Agent, or Firm* — Staas & Halsey LLP

(57) ABSTRACT

A method automatically plans a meeting between at least two participants taking into account electronically stored calendar data relating to the participants. After the participants have been input and after at least one period of time and/or one duration and/or one item of location information for the meeting has/have been input, at least one proposed appointment is automatically determined, taking into account at least one item of arrival information relating to at least one participant in the meeting and the calendar data. The proposed appointment is displayed to at least one participant, in particular at least the person scheduling the meeting.

19 Claims, 2 Drawing Sheets

METHOD AND SYSTEM FOR THE AUTOMATED PLANNING OF A MEETING BETWEEN AT LEAST TWO PARTICIPANTS

CROSS REFERENCE TO RELATED APPLICATIONS

This application is based on and hereby claims priority to German Application No. 102011010584.0 filed on Feb. 8, 2011, the contents of which are hereby incorporated by reference.

BACKGROUND

The invention relates to a method and a system for the automated planning of a meeting between at least two participants taking into account electronically stored calendar data relating to the participants.

In order to organize a meeting between private individuals or business people nowadays, a large amount of effort is usually required and optimum success remains uncertain. If a person wishes to invite other people to a meeting, for example, the person scheduling the meeting must initially reach the other participants via a communication medium and must arrange a common appointment with said participants. Optimum appointments in terms of time and location are not always made in this case; the participants then often discover that, on account of the outward journey arrangements, an appointment one hour later or earlier would have been more favorable, for example, since a considerable amount of outward journey time and/or return journey time would then have been saved, for example.

The method of transport (perhaps public transport) for the outward journey are then usually also laboriously reserved by the participants themselves. Nearby further appointments of the participants themselves or the like, are often not taken into account either.

The known manual procedure when agreeing on appointments, comprising the time and location of a meeting, therefore has a multiplicity of disadvantages. The appointment calendars of the participants and the reservation are not synchronized since the person scheduling the meeting does not have an overview of the calendar data relating to the other participants. Travel times as well as preparation and follow-up times (registration, presentation preparation, search for a parking space, etc.) for a conference are not taken into account. Agreement in the event of a change to the proposed appointment is associated with a large amount of effort and there is no systematic assistance when dealing with the approach route or determining the costs of the approach route and there is no easy possible way of determining when participants are delayed.

US 2009/0210262 A1 proposes an automatic travel system which can cooperate with an appointment application in order to synchronize the appointment calendars of the participants with one another and to automatically reserve the corresponding method of transport after an appointment has been determined. However, this does not take overall account of the abovementioned problems, in particular since the actual appointment agreement process is not adequately supported.

SUMMARY

One possible object is to specify a method which can be used by the person scheduling a meeting and/or the meeting participants to determine an appointment for a meeting with as little effort as possible, which appointment is also optimum as regards the arrival and/or departure.

After the participants have been input and after at least one period of time and/or one duration and/or one item of location information for the meeting has/have been input, the inventors propose for at least one proposed appointment to be automatically determined, taking into account at least one item of arrival information relating to at least one participant in the meeting and the calendar data, and to be displayed to at least one participant, in particular at least the person scheduling the meeting.

The inventors thus propose that at least one proposed appointment, that is to say a proposed time and/or a proposed location, is automatically generated taking into account the calendar data and at least one item of arrival information. The calendar data relating to the participants are thus synchronized and at least one item of information relating to their arrival is automatically taken into account in order to already work out possible proposed appointments which are as optimal as possible in an automated manner. For this purpose, the person scheduling the meeting, who is himself a participant in particular, needs to make only a few inputs which are particularly advantageously all available, namely a period of time, a duration and an item of location information, that is to say a location, a selection of possible locations or else a particular local area in which the meeting is intended to take place.

The method can then be implemented, for example, in the form of a computer program which runs on a local computation device or a server and has access to different data sources, in particular via the Internet, in which case data, in particular at least one profile of at least one participating person, may also naturally already be present in the computation device or the server. These data, to which the program has access, that is to say via communication links or a computer memory, then comprise, in particular, the calendar data relating to the persons participating in such a system and, generally speaking, travel data from which the at least one item of arrival information can be determined. These may be, for example, map data, data relating to the method of transport and their availability and the like.

Ultimately, the proposed method also starts in this case from a journey starting point and/or a return journey destination of the participants, which can fundamentally be defined as their residence and/or place of work, for example, but can also be determined in a time-dependent manner, for example on the basis of the calendar data, if the participant has already agreed on other appointments at different locations, for example.

The method thus results in simpler planning of meetings, for example conferences, since proposed appointments with respect to the location and/or the time can be created in an automated manner. In this case, the method can advantageously be used both for private individuals and in business. The appointment calendars are synchronized and can be seen by the person scheduling the meeting and/or other participants, if necessary in restricted form. A punctual start is supported since the arrival can also be taken into account. The number of cancellations can be reduced since further information relating to the participants can already be taken into account when organizing the conference.

At least one arrival time which is automatically determined taking into account travel data and at least one optimization criterion can be determined for each participant as arrival information. Different travel itineraries and arrival times resulting from the latter are thus advantageously determined and assessed under optimization criteria, the optimization criteria being able to relate to the arrival of the individual participants and/or all participants. A multiplicity of fundamentally known items of information can be interrogated as travel data or already known systems can be used. For example, it is conceivable to use a route planner for using a motor vehicle if the use of such a vehicle is possible for the participant; timetables of public methods of transport such as train, bus and/or aircraft can be interrogated and routes can be determined on the basis of map data. A set of possible travel itineraries with associated arrival times thus results, these travel itineraries then being assessed using optimization criteria in such a manner that at least one optimum proposed appointment results. In this case, it should already be noted at this point that optimization criteria may also be participant-specific if the intention is to use a profile of the participant, which profile can be specially created for the proposed system, or else a concomitantly used profile from another system. For example, participants may have particular preferences for methods of transport or may attach more importance to environmentally friendly progress. For example, the costs, the travel time and/or the environmental compatibility may be set as general and participant-specific optimization criteria. It is finally then possible to process the arrival times and, if appropriate, the locations of the meeting which are associated with said times, if a plurality of locations are possible, in such a manner that one or more optimum proposed appointments are obtained to which all participants can travel, there also being a sensible travel itinerary. If, for example, no possible proposed appointment is determined when a period of time is stated, a corresponding warning can be output to the person scheduling the meeting, which person should then adapt or change the parameters of the meeting.

Another advantageous refinement of the method may provide for at least one item of travel itinerary information to be assigned to each arrival time, in which case, when a proposed appointment is accepted by all compulsory participants, at least one function which assists with the undertaking of the journey is automatically performed. The travel itinerary information which relates to the travel itinerary and is used as a basis when determining the arrival time may comprise, for example, the method of transport to be used, arrival routes, departure and arrival times and/or costs. This travel itinerary information is now stored in order to advantageously use it for further automation prior to the meeting by automatically performing further functions.

Provision can therefore be made for the reservation of a method of transport and/or the transmission of data, in particular a distance and/or a map, to a navigation system and/or the output of advice, in particular temporally staggered advice, before and/or during the outward journey to be performed as the function. It is thus initially possible, when all participants have accepted a proposed appointment, to immediately automatically reserve a method of transport, for example aircraft and/or buses and/or trains and/or rental cars. There is therefore then also a type of "synchronization" of the reservation. The corresponding information relating to the travel itinerary are naturally also made available to the participants.

As also mentioned, it is also possible to make the travel itinerary information at least partially available to a navigation system. The navigation system can then automatically guide the participant for part or all of the outward journey without any further necessary inputs by the participant, guidance inside buildings, for example to seminar rooms, also being conceivable. In this case, the term "navigation system" should be broadly understood as any electronic device having navigation functionality, for example as a result of a suitable program being installed.

However, it is particularly preferred if advice, in particular temporally staggered advice, is output before and/or during the outward journey. For this purpose, the participant-specific travel itinerary information is thus transmitted, for example, to a mobile electronic device which belongs to the participant and on which a monitoring program can be installed. The task of this monitoring program is to start a type of "countdown" and to monitor the travel itinerary. In this way, the participants may receive advice, from the mobile device and/or a PC for example, of when they should set out for the appointment. This request is made at an individual time for each participant since the duration of the outward journey and possible preparation times are different. During the outward journey, the participants then continuously receive advice relating to the travel itinerary, for example which method of transport should be used next, where the participant should walk or travel to next, in which case guidance can also be implemented inside buildings. The participants are thus informed of their ideal outward journey in a fully automatic and up-to-date manner.

In this connection, it is particularly advantageous if current data relating to the feasibility of the outward journey described by the travel itinerary information are automatically determined before and/or during the outward journey and, if non-feasibility is determined, an amended item of travel itinerary information relating to an alternative outward journey which can be carried out is automatically determined or the participants are informed of the non-feasibility of the outward journey, in particular by submitting a new proposed appointment. In this case, the non-feasibility can also correspond to a necessary lack of punctuality, in particular the overshooting of a delay threshold. The program of the system, in particular the monitoring program mentioned, is designed to automatically retrieve information from different information sources which relate to the correct feasibility of the journey. For example, information relating to delays in public transport or to traffic jams or closures can be interrogated. The feasibility of the travel itinerary is thus continuously monitored, with the result that delays can also be incidentally automatically determined in good time. It is then conceivable and expedient to automatically send a corresponding item of delay information to the other participants and/or the person scheduling the meeting.

Provision can generally be made for the period of time to be defined by inputting a last possible appointment. It is then necessary to find possible times for a meeting, that is to say in the period of time between the current time and the last possible appointment which has been input.

An expedient development of the concept may provide for at least one further criterion for a meeting to be defined by the user, in particular at least one compulsory participant and/or a procedure in the event of the meeting being impossible in the period of time and/or at least one representative of at least one participant. It is thus possible to divide participants into absolutely necessary participants and optional participants in order to define an additional criterion. A proposed appointment is only possible when the compulsory participants all have time, while the participation of an optional participant is not necessary for a proposed appointment. Furthermore, a procedure in the event of the meeting being impossible, for example contacting a suitable representative, two separate conferences, the omission of a participant who has previously been absolutely necessary or the like, can be defined as early as when scheduling the meeting. The mention of at least one representative of at least one participating person may also be an expedient additional criterion since, when this person does not have any time, it is possible to check whether his representative is possibly available. A type of prioritization therefore then takes place, during which a check is first of all carried out in order to determine whether a proposed appointment is possible with the actual participant, in which case the representative is then used if a proposed appointment is impossible.

An agenda can be expediently input by the person scheduling the meeting, which agenda is displayed to the participants, in particular in a manner such that it can be edited. The method can therefore also make it possible to put the agenda up for discussion and to suitably agree on the latter even before a meeting. Requests to change the agenda can be sent to the person scheduling the meeting, for example, and/or participants can indirectly change the agenda. This makes it possible to conduct conferences, that is to say meetings, in a very effective manner since the agenda can already be previously agreed on in an effective manner.

As already mentioned, provision can also be made, in the case of an item of location information which defines at least one region for the meeting, for the proposed appointment to be comprehensively determined as a proposed location, the proposed location also being automatically determined, in particular, taking into account the arrival information or at least one item of arrival information. Not only the time of the meeting but also the location of the meeting can therefore be left open in a particularly advantageous manner and it is possible to define, taking into account the arrival information, where a region or the like can be stated for the meeting, for example, with the result that the location which can best be reached by all participants is then determined and proposed.

As likewise already mentioned, a plurality of possible proposed appointments, in particular proposed appointments selected using an or the automatically evaluated optimization criterion, can be displayed to the person scheduling the meeting and at least one proposed appointment selected from these proposed appointments can be transmitted to the other participants for confirmation. The planning system therefore automatically provides the person scheduling the meeting with a plurality of proposed appointments containing corresponding proposed times and possibly proposed locations. The appointment variant which appears to be most favorable to the person scheduling the meeting can then be selected from these proposed appointments, with the result that an invitation can then be sent to the participants on the basis of the selected proposed appointment. In this case, it is particularly advantageous if, when determining at least one item of travel itinerary information, the travel itinerary information and/or an item of information derived from the latter, in particular an item of information based on the costs of the outward journey and/or the duration of the outward journey and/or a route description, is/are displayed with the proposed appointments and/or is/are transmitted to the other participants, in particular in a participant-specific manner. In the display for the person scheduling the meeting, the latter therefore receives, in particular within the scope of the selection, additional information, for example the route descriptions including the outward journey duration, the means of transport and the resultant expenditure, with the result that a decision can be made in a substantiated manner. It is also expedient if the other participants also receive the travel itinerary information or the information derived from the latter as early as with the invitation to the selected proposed appointment, with the result that a decision can be made, for example on the basis of the expenditure or the like, as to whether the proposal is acceptable to the participant.

If any proposed appointment is rejected by at least one compulsory participant, provision may also be made for at least one new proposed appointment to be automatically determined with the exclusion of the previous proposed appointment. For example, provision may be made for a further proposed appointment which has possibly not been selected and/or has been given a poorer rating but has already been determined anyway to now be set; however, it is also possible to determine completely new proposed appointments.

It is also possible, in a particularly advantageous manner, for a preparation time and/or a follow-up time for the meeting to be additionally input, in particular in a participant-specific manner, and to be taken into account when determining the proposed appointment. Preparation times may describe, for example, how long it takes for the systems to be started up, for the media to be set up and/or for exhibits which have been brought along to be ready for presentation in a conference room. Registration times, for example in the reception area of a company, may also be present as preparation times for participants. Follow-up times may be, for example, sign-out times in a reception area, but it is also conceivable to make notes on points of interest, to generate reports or the like in the follow-up time. These times may now also be advantageously concomitantly taken into consideration when working out proposed appointments, with the result that a punctual start and an optimized outward journey are possible and time is therefore saved.

One particularly advantageous development of the method may provide for the current position of all participants, in particular during the outward journeys, to be automatically determined and to be made available to at least one participant, in particular all participants. Information relating to the current position of the participants can be automatically forwarded, for example, to the main system, that is to say a server, with the result that it is generally possible for all participants to obtain information relating to where the other participants are and what delays they possibly have to expect in each case. In this case, it is incidentally also generally noted that, in the method, it is possible at any time to recalculate the journey, for example with the aid of the monitoring program (already mentioned), if a participant has missed a connection to a method of transport or the like, for example. In this manner, there is a constant complete overview of the overall situation and it is possible to correctly estimate whether the meeting can take place punctually. In this case, the current position can be determined in various ways, for example via a GPS sensor in a mobile device, but also via inputs by the participants, activated electronic tickets, the position in a mobile radio network and the like.

As already mentioned, provision may be made for at least one item of information intended for at least one participant to be output to a mobile device belonging to the participant, in particular a mobile telephone and/or a navigation device and/or a pocket PC. As already mentioned, a monitoring program may be installed on such devices, which program can perform its own functionalities but is also in data interchange contact with a further program which is arranged, in particular, on a server and is intended to carry out the method. In particular, the so-called "smartphones" have proven to be particularly suitable within the scope of the proposed method.

One development of the concept may provide for at least one item of return journey information relating to the return journey and/or at least one further item of outward journey information which describes the outward journey to a further appointment planned using the method to be determined for at least one participant, in particular all participants, and to be made available to the respective participant. The method can thus also determine corresponding information for the return journey and, in a particularly advantageous manner, may have the same functionalities which have already been described with respect to the outward journey, in particular therefore the automatic triggering of functionalities such as reservation, navigation and/or the output of advice, continuous monitoring of the feasibility of the journey and the automatic finding of alternative outward journeys in the event of non-feasibility etc. In particular, however, the return journey information and/or the further outward journey information describing the outward journey to a further appointment planned using the method can also be already taken into account when determining the proposed appointment since this information can also influence the selection of optimum proposed appointments. The optimization criteria which have already been described can also be used in an analogous manner for the return journey, with the result that the method can be matched to the consideration of all travel arrangements for the meeting without any problems.

Provision may also be expediently made for a profile of at least one participant to be taken into account when determining the proposed appointment and/or the outward journey information and/or further information. Such a profile (already mentioned) may store, in particular, travel and appointment preferences of the corresponding person, which preferences can then accordingly influence participant-specific optimization criteria, for example.

Particularly in connection with the profiles just mentioned or else generally, it is particularly advantageous if the method is carried out within a business network and/or a social network. The method can be effectively used within already existing networks, for example business networks and/or social networks, the planning functions ultimately being able to be implemented as an additional function, for example by creating a suitable applet/app, plug-in or associated program. The users can then also additionally plan meetings for private or business purposes from customary network environments with the assistance of the method.

In addition to the method, the inventors also propose a system for the automated planning of a meeting between at least two participants taking into account electronically stored calendar data relating to the participants, which system is designed to carry out the method. All of the statements made with respect to the method can be analogously applied to the system, with the result that the advantages mentioned can also be achieved with said system.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
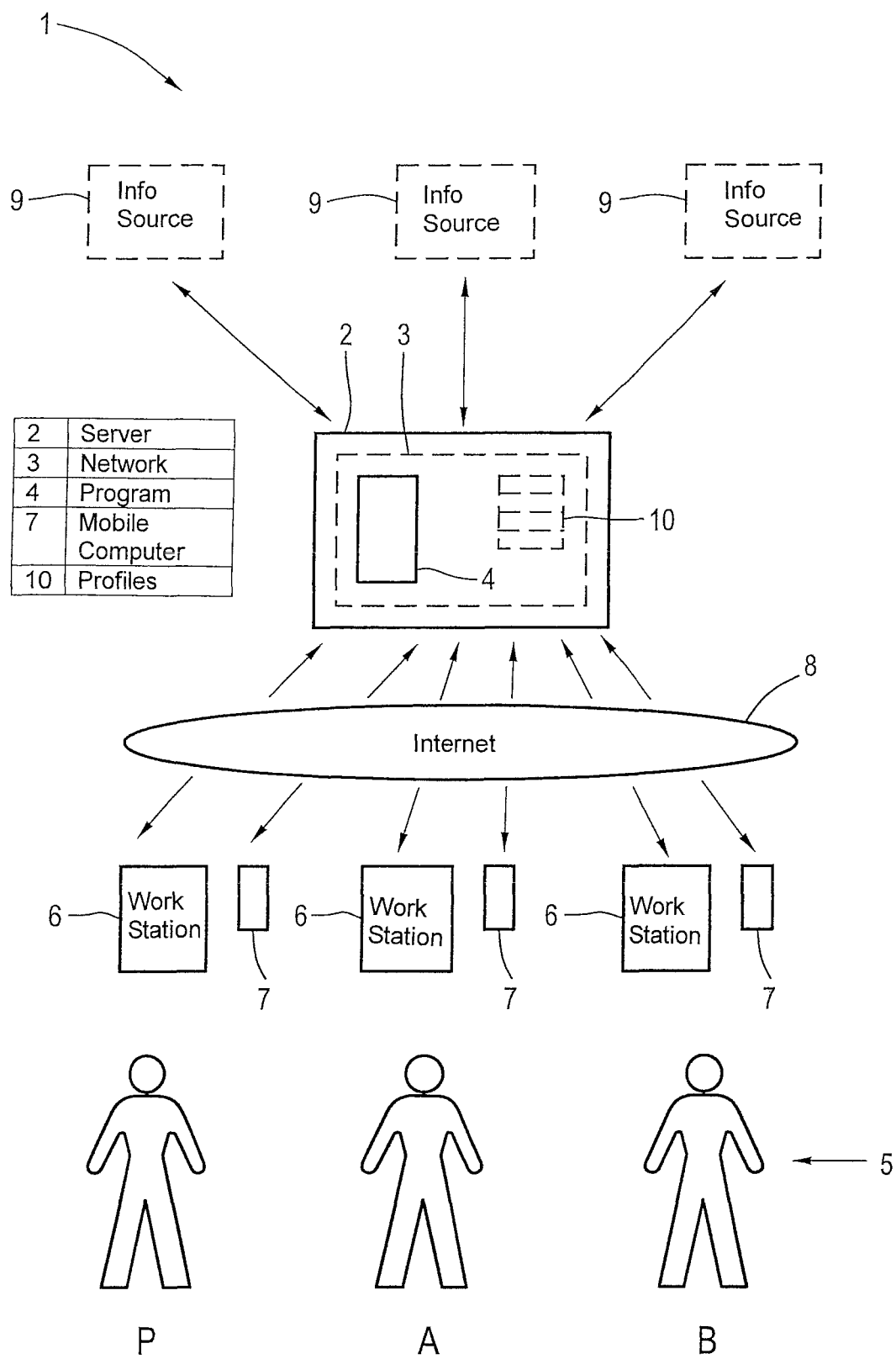
FIG. 1 shows an overview sketch of a system according to one possible embodiment of the inventors' proposals.

Reference will now be made in detail to the preferred embodiments of the present invention, examples of which are illustrated in the accompanying drawings, wherein like reference numerals refer to like elements throughout.

FIG. 1 shows a basic sketch of a system 1 according to one possible embodiment. The centerpiece of the proposed method is one or more servers 2 on which various program and database components of a network 3, for example a social network or a business network, are stored. A program 4 which centrally coordinates the method and can be stored on the server 2 or another server is embedded in the network 3, that is to say in the form of a plug-in or the like for example. In the present case, it is also shown as being present on the server 2 by way of example. The network 3 has a multiplicity of subscribers 5, of which a person P wishing to schedule a meeting and other desired participants A and B in the meeting are shown here by way of example. In this exemplary embodiment, a business appointment, that is to say a meeting, is assumed, with the result that the persons P, A and B each have access to a workstation computer 6, for example a PC, and a mobile device 7, for example a navigation system, a mobile telephone and/or a pocket PC. The workstation computers 6 and the mobile devices 7 communicate with the server 2 via the Internet 8, for example. In particular, the server 2 is also able to set up data links to further information sources 9, that is to say further computation devices, via the Internet 8, which is discussed in yet more detail below. Within the network 3, profiles 10 which also contain information used by the system are also incidentally assigned to the subscribers 5.

Figure 2:
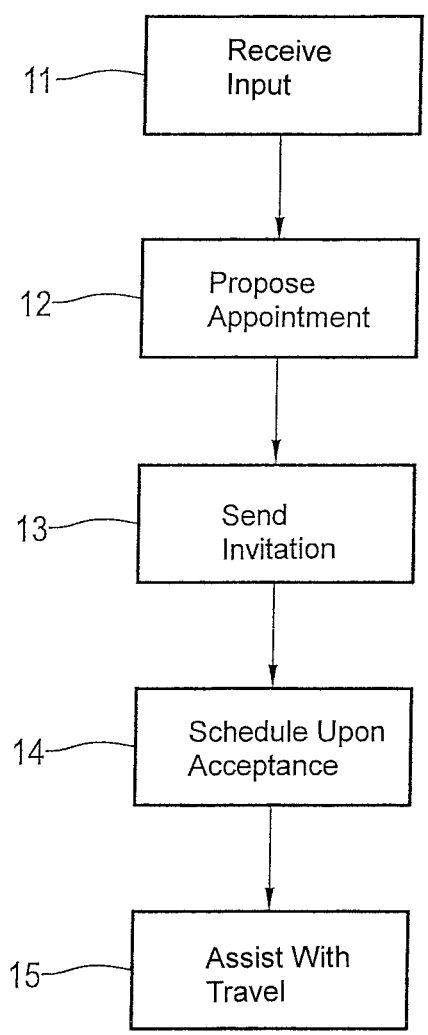
FIG. 2 shows a flowchart of the proposed method.

The system 1 is now designed to carry out the method which shall be explained in more detail below with reference to FIG. 2.

As already mentioned, in the present example, the person P scheduling the meeting would like to invite two external team colleagues, the participants A and B, to a meeting. Therefore, the person P uses his workstation computer 6 to communicate the following information to the system 1:

compulsory and optional participants in the meeting, in which case it is assumed in the present case that the participants A, B are both compulsory participants, optionally a period of time, in particular a date, by which the meeting is supposed to have taken place, optionally further criteria for the meeting, for example the procedure in the event of the meeting being impossible in the period of time and representatives of the participants A, B, the duration of the conference, optionally the preparation time and/or follow-up time of the meeting, an outline of the agenda of the meeting, information relating to the location of the meeting, that is to say, in particular, a firmly predefined location for the meeting or at least one region in which the meeting is intended to take place.

These inputs are now automatically evaluated by the system 1 in order to determine at least one proposed appointment which comprises a proposed time and a proposed location. The system 1 can namely retrieve travel data taking into account the further information sources 9, which travel data can be used to determine possible travel itineraries to the possible locations of the meeting at the possible times for a meeting. These different travel itineraries which are naturally determined in a participant-specific manner are now automatically assessed using optimization criteria, preferences of the persons P, A and B that are stored in the profiles 10 being able to be taken into account in particular. For this purpose, the system 1 also has access to calendar data relating to the persons P, A and B, which data can also be evaluated in order to determine the starting point for the outward journey and/or to already exclude particular appointments fundamentally on account of other appointments of compulsory participants. However, not only are participant-specific optimization criteria conceivable, but rather it is also possible to take into account general optimization criteria. In this case, the fact that the journey duration should be as short as possible, the expenditure should be as low as possible and there is good environmental compatibility is taken into account. Preferences for a particular method of transport or the like can be taken into account, for example, as participant-specific optimization criteria. Ultimately assessed outward journey times result as arrival times, which outward journey times can be used to determine possible appointments of a temporal and geographical nature which are then likewise assessed further using optimization criteria, for example short waiting times or the like. The result of the automatic determination in step 12 is therefore a plurality of possible proposed appointments, in which case, the five proposed appointments with the best rating can be found, for example. The travel itineraries for these proposed appointments are incidentally likewise stored; this means that there is travel itinerary information for every proposed appointment. Similar observations are also taken into account for the return journey or for the outward journey to a further appointment for the participants P, A and B which is planned using the system. Travel itinerary information is also stored for this purpose.

The proposed appointments are now displayed to the person P scheduling the meeting, for example via a display of the workstation computer 6. The person thus receives proposals for possible times and locations for the meeting and, as additional information, the route descriptions of all participants P, A and B to said locations, including the outward journey duration and proposed method of transport and the expenditure resulting from the travel itinerary.

It should also be noted at this point that, if no possible proposed appointment is found, provision is also made for corresponding advice to be output to the person P and for the latter to be able to change his input in step 11 again.

From the proposed appointments displayed to him, the person P now selects the appointment variant which appears to be most favorable to him. Then a corresponding invitation is sent to the participants A, B in a step 13, which invitation additionally contains the travel itinerary information or the information derived from the latter, that is to say explains, for example, how the participants can arrive at the proposed conference location and what expenditure can be expected. The participants are also informed of the agenda.

The invited colleagues, participants A and B, now confirm or report change requests, for example with respect to the agenda and/or the conference time, back to the person P. Like the person P, the participants can take into account the appointment calendars of the other participants P, A and B. Further criteria, such as approach routes, expenditure for the outward journey and the preparation and follow-on time, are also taken into account, with the result that only sensible proposals arise. With regard to the change in the agenda, provision may also be made for a direct change to already take place in the system 1. If an appointment for the meeting that is acceptable to all participants has finally been found, this definitive appointment can be confirmed for all participants, step 14.

In a step 15, this now results in the performance of some functions which are automatically performed and assist with travel. The most favorable method of transport according to the travel itinerary information are first of all reserved automatically or possibly also semi-automatically with the participation of the persons P, A and B for the outward journey and return journey or the journey to the next destination via the system 1. If this is not carried out in a fully automatic manner but rather only with the assistance of the system 1, each participant can do this himself or can instruct another participant who is authorized to do so. However, completely automatic reservation using the travel itinerary information is preferred.

In the present exemplary embodiment, it is now also the case that the participants P, A and B have installed a monitoring program on their mobile devices 7, which program can access current appointment and travel data. The task of the monitoring program is to start a countdown and to monitor the time to the destination and the travel data.

In this case, it should already be noted at this point that the current position of the participants P, A and B is continuously tracked, for example by a position sensor, involved stations of a mobile radio network, automatically validated tickets and the like, and is continuously forwarded to the server 2 in the system 1, with the result that all participants P, A and B can receive information at any time relating to where the other participants are and what delays they possibly have to expect in each case. It is also noted that the system 1, in particular the monitoring program, is also able at any time to recalculate the travel itinerary again if, for example, a method of transport fails, a connection is missed or the like.

However, all participants P, A and B initially receive advice on when they should set out before the meeting. This request is made at an individual time for each participant P, A and B since the duration of the outward journey and the possible preparation times are different. During the outward journey, the participants P, A and B also receive assistance via their mobile device 7 by continuously receiving, in particular, a description of the rest of the travel itinerary, in particular a route description to the location of the meeting via a navigation option for example, in particular even inside buildings. The travel itinerary information relating to the method of transport to be used is also continuously displayed in an up-to-date manner. The tracking makes it possible to inform the other participants P, A and B without any problems in the event of delays, for example unforeseen traffic jams, delays of public transport and the like. As already mentioned, assistance is provided in this exemplary embodiment, in an automatic manner, even when finding the conference room and shows a route inside buildings.

P is now the first to arrive at the location of the meeting. He prepares for the meeting. He starts up the systems in the conference room, sets up the media and sets up some exhibits which have been brought along. He can start punctually since he can do this in the preparation time which was taken into account when determining the proposed appointment, as was the follow-up time. The external colleagues, participants A, B, have registered in the reception area of the premises during their preparation time.

The conference can now be carried out in a very effective manner since the agenda has previously been agreed on in an effective manner.

After the conference, P tidies everything up. He makes notes on points of interest which are still fresh in his mind from the meeting. He does this during the follow-on time which is likewise taken into account. The other participants sign out in the reception area in the follow-up time.

Even during the return journey or the journey to the next planned meeting, the journey is again assisted by the system 1, as described with respect to step 15, with the result that the participants P, A and B who have a subsequent appointment can punctually also appear at their next meeting in particular.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

What is claimed is:

1. A method for automatically planning a meeting between at least two participants, comprising:
   receiving first data identifying the participants;
   receiving information identifying at least one representative corresponding to at least one participant;
   receiving second data identifying at least one of meeting time, meeting duration and meeting location, at least one of the first and second data being received from a person scheduling the meeting;
   receiving a preparation time and a follow-up time required for the meeting;
   obtaining arrival information relating to a traveling participant;
   consulting electronically stored calendar data relating to the participants;
   determining, using a navigation system, a current position of the traveling participant;
   automatically determining, using a computer, a proposed appointment taking into account the first and second data, the received preparation time and follow-up time, the arrival information, the calendar data, and the current position of the traveling participant;
   displaying the proposed appointment to the person scheduling the meeting;
   determining, during an outward journey by the traveling participant to the proposed appointment, whether the traveling participant will be delayed;
   notifying, by the computer, at least one other participant that the traveling participant is delayed, in response to the determination that the traveling participant is delayed;
   providing the current position of the delayed traveling participant obtained by the navigation system to the at least one other participant, in response to the determination that the traveling participant is delayed;
   automatically changing the meeting time for the proposed appointment and informing the at least one other participant of the changed meeting time, if the traveling participant is delayed such that the traveling participant can arrive at the proposed appointment within a predetermined period of time after the meeting time; and
   automatically submitting a new proposed appointment to the participants if the traveling participant is delayed such that the traveling participant cannot arrive at the proposed appointment within the predetermined period of time after the meeting time,
   wherein the automatically determining the proposed appointment further includes determining whether a respective participant has a corresponding representative when the respective participant is not available for the proposed appointment, and determining whether the corresponding representative is available for the proposed appointment when the respective participant is not available for the proposed appointment and the respective participant has a corresponding representative.

2. The method according to claim 1, wherein the arrival information is automatically determined based on travel data and a travel optimization criterion for the traveling participant.

3. The method according to claim 2, wherein
   travel itinerary information is assigned to the traveling participant, and
   when a proposed appointment is accepted by all participants, the travel itinerary information is used to automatically plan the outward journey for the traveling participant.

4. The method according to claim 3, wherein the outward journey is automatically planned by at least one of:
   reserving a method of transport,
   transmitting distance or map data to a navigation system, and
   outputting temporally staggered advice during the outward journey.

5. The method according to claim 3, wherein the determining of whether the traveling participant will be delayed comprises continuously evaluating feasibility of the outward journey.

6. The method according to claim 1, further comprising receiving at least one of information identifying at least one compulsory participant or receiving information identifying a procedure to be followed if the meeting is determined to be impossible,
   wherein the meeting is determined to be impossible based on at least one of a timing conflict or unavailability of at least one compulsory participant.

7. The method according to claim 1, further comprising:
   receiving an agenda from the person scheduling the meeting; and
   displaying the agenda to the participants, in a manner such that the agenda can be edited.

8. The method according to claim 1, wherein
   the second data includes meeting location,
   the meeting location defines a geographic region for the meeting, and
   the proposed appointment includes a proposed location.

9. The method according to claim 1, wherein
   a plurality of possible proposed appointments are automatically determined and displayed to the person scheduling the meeting, and
   the person scheduling the meeting excludes at least one of the proposed appointments and transmits each remaining proposed appointment to at least one participant for confirmation.

10. The method according to claim 3, wherein
the travel itinerary information is determined by a process that comprises determining cost and duration of the outward journey and determining a route description,
the cost and duration of the outward journey and the route description are communicated to the traveling participant.

11. The method according to claim 1, wherein a current position of all participants during their respective outward journeys is automatically determined and made available to at least one participant.

12. The method according to claim 3, wherein a multi-meeting participant has consecutive first and second meetings, and
travel itinerary information is assigned to the multi-meeting participant, to automatically plan an outward journey from the first meeting to the second meeting.

13. The method according to claim 1, wherein the stored calendar data is obtained from a business network and/or a social network.

14. The method according to claim 1, wherein the person scheduling the meeting is one of the participants in the meeting.

15. A system to automatically plan a meeting between at least two participants, comprising:
   a navigation system to obtain arrival information relating to a traveling participant;
   a server to electronically store calendar data relating to the participants;
   a computer processor to:
      receive first data identifying the participants;
      receive information identifying at least one representative corresponding to at least one participant;
      receive second data identifying at least one of meeting timing, meeting duration and meeting location, at least one of the first and second data being received from a person scheduling the meeting;
      automatically determine a proposed appointment taking into account the first and second data, the arrival information, and the calendar data;
      determine, during an outward journey by the traveling participant to the proposed appointment, whether the traveling participant will be delayed; and
   an output to display the proposed appointment to the person scheduling the meeting,
   wherein the navigation system determines a current position of the traveling participant, and
   when the traveling participant is delayed, the computer processor:
   notifies at least one other participant that the traveling participant is delayed,
   provides the current position of the traveling participant obtained by the navigation system to the at least one other participant,
   automatically changes the meeting time for the proposed appointment and informs the at least one other participant of the changed meeting time, if the traveling participant is delayed such that the traveling participant can arrive at the proposed appointment within a predetermined period of time after the meeting time; and
   automatically submits a new proposed appointment to the participants if the traveling participant is delayed such that the traveling participant cannot arrive at the proposed appointment within the predetermined period of time after the meeting time,
   wherein the computer processor determines whether a respective participant has a corresponding representative when the respective participant is not available for the proposed appointment, and determines whether the corresponding representative is available for the proposed appointment when the respective participant is not available for the proposed appointment and the respective participant has a corresponding representative.

16. A non-transitory computer readable medium storing a program to control a computer to perform a method of automatically planning a meeting between at least two participants, the method comprising:
   receiving first data identifying the participants;
   receiving information identifying at least one representative corresponding to at least one participant;
   receiving second data identifying at least one of meeting timing, meeting duration and meeting location, at least one of the first and second data being received from a person scheduling the meeting;
   receiving a preparation time and a follow-up time required for the meeting;
   obtaining arrival information relating to a traveling participant;
   consulting electronically stored calendar data relating to the participants;
   determining, using a navigation system, a current position of the traveling participant;
   automatically determining, using a computer, a proposed appointment taking into account the first and second data, the received preparation time and follow-up time, the arrival information, the calendar data, and the current position of the traveling participant;
   displaying the proposed appointment to the person scheduling the meeting;
   determining, during an outward journey by the traveling participant to the proposed appointment, whether the traveling participant will be delayed;
   notifying, by the computer, at least one other participant that the traveling participant is delayed, in response to the determination that the traveling participant is delayed;
   providing the current position of the delayed traveling participant obtained by the navigation system to the at least one other participant, in response to the determination that the traveling participant is delayed;
   automatically changing the meeting time for the proposed appointment and informing the at least one other participant of the changed meeting time, if the traveling participant is delayed such that the traveling participant can arrive at the proposed appointment within a predetermined period of time after the meeting time; and
   automatically submitting a new proposed appointment to the participants if the traveling participant is delayed such that the traveling participant cannot arrive at the proposed appointment within the predetermined period of time after the meeting time,
   wherein the automatically determining the proposed appointment further includes determining whether a respective participant has a corresponding representative when the respective participant is not available for the proposed appointment, and determining whether the corresponding representative is available for the proposed appointment when the respective participant is not available for the proposed appointment and the respective participant has a corresponding representative.

17. The system as claimed in claim 15, wherein
the current position of the traveling participant is provided to all other participants, when the traveling participant is determined to be delayed.

18. The system as claimed in claim 17, wherein
an expected delay is determined by the navigation system using the current position of the traveling participant obtained by the navigation system, and
the expected delay is provided to the at least one other participant.

19. The method according to claim 1, wherein
the preparation time takes into account at least one of a set-up time for the meeting, registration time for the meeting, and time for searching for a parking space, and
the follow-up time takes into account at least one of a sign-out time for the meeting, time for making notes regarding the meeting, and time for generating reports regarding the meeting.

\* \* \* \* \*